No. 833,182.  
PATENTED OCT. 16, 1906.  
J. S. SMITH.  
METHOD OF PRODUCING GAS.  
APPLICATION FILED JULY 18, 1904.
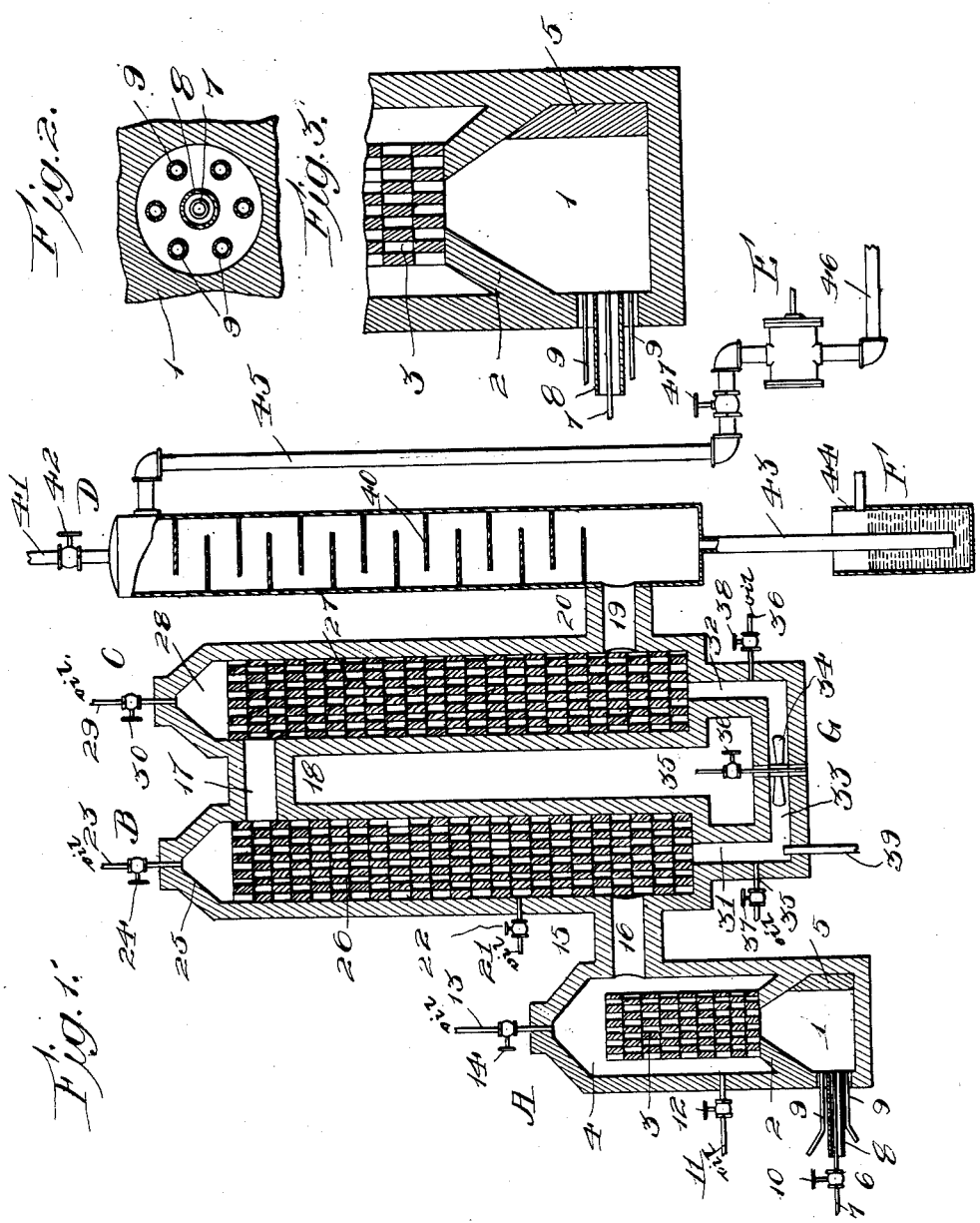
Witnesses:  
L. V. Donyarus.  
J. B. Weir.
Inventor:  
Jacob S. Smith  
By Elliott Hopkins  
Attys

UNITED STATES PATENT OFFICE.

JACOB S. SMITH, OF CHICAGO, ILLINOIS.

METHOD OF PRODUCING GAS.

No. 833,182.      Specification of Letters Patent.      Patented Oct. 16, 1906.

Application filed July 18, 1904. Serial No. 216,930.

*To all whom it may concern:*

Be it known that I, JACOB S. SMITH, of the city of Chicago, in the county of Cook and State of Illinois, have invented certain new and useful Improvements in Methods of Producing Gas, of which the following is a specification.

This invention relates to improvements in methods for producing gas from hydrocarbons and steam, with or without the employment of air, in and during the performance of which dissociated hydrogen, owing to its specific gravity, first accumulates in the upper part of the carbureters and finally overflows the same into a scrubber and thence into a main, gasometer, or other receptacle, and as a result of which the refractory hydrocarbons are not reduced and the heat units and candle-power of the gas finally produced are correspondingly diminished.

Prior to my invention the common practice has been to conduct the gases from a generator in but one direction through the carbureters—namely, from the bottom to the top thereof—to which end there is a pipe connection between the upper end portion of the generator and the lower end portions of a plurality of carbureters, the carbureters being connected by an external pipe connection with the upper end portion of the first carbureter, and so on to a similar connection between the last carbureter and the bottom portion of a scrubber, with the result that dissociated hydrogen, owing to its lesser specific gravity than the other gases, first accumulates in the upper part of and finally fills the first carbureter. The bottoms of the carbureters are also frequently connected with the generator by a header common to all and connected with each other near the upper ends by horizontal pipes and also with the bottom portion of the scrubber, the result being that dissociated hydrogen continuously passes through the carbureters and through the scrubber into the mains or other receptacle and continuously remains uncombined with the other gases.

The volume of dissociated hydrogen discharging into a main or gasometer not only represents a loss of heat units in the gas, but a reduction in candle-power, for with the presence of dissociated hydrogen there follows refractory hydrocarbons subsequently discharged with the coal-tar, which would, if combined with the dissociated hydrogen, correspondingly increase the candle-power of the gas produced.

The prime object of my invention is not only to reduce in the carbureters the volume of dissociated hydrogen, but the existence of refractory hydrocarbons as far as may be, and thereby correspondingly increase the heat units and candle-power of the gas produced and by a method not only effective but capable of being employed in a simple apparatus economical both in construction and manipulation.

A further object of my invention is the employment of a method by which the gas may be subjected to a higher degree of heat in the carbureters than has heretofore been possible and to return a portion of said gases, and more particularly the dissociated hydrogen and refractory hydrocarbons, to direct heat from the generator after said gases are passed through a plurality of carbureters, and this in the presence of a continuous circulation of the combined gases from the generator through the carbureters and the scrubber to the main or other receptacle therefor.

A still further object of my invention is to return the dissociated hydrogen and refractory hydrocarbons from the last carbureter of a plurality of carbureters to the first, and therefore the hottest, carbureter during the discharge of combined gases from the last carbureter to the scrubber and at the same time supply said return-gases during their return with hydrocarbons and at such a point in their return as to raise their temperature and increase the candle-power of the gas produced as compared with what it might otherwise have on its discharge from the generator and to also simultaneously supply said gases during their return with steam at a temperature promoting decomposition and substantially adding to the heat units of the gas discharged from the generator.

An incidental and further object of my invention is to reduce the production of coal-tar and other refractory hydrocarbons during the manufacture of gas and correspondingly promote the quality of the gas and decrease its cost of manufacture.

With these ends in view my invention consists in certain methods by which said objects and certain other objects hereinafter fully appearing are attained, as fully described with reference to the accompanying drawings and more particularly pointed out in the claims.

As a means by which my improved method may be performed there is illustrated in the accompanying drawings an apparatus and details thereof which may be used to advantage, and in which—

Figure 1 represents a gas-producing apparatus, the generator, carbureters, scrubber, and coal-tar receptacle being shown in vertical and longitudinal sections, together with the exhaust-pump and its pipe connection, with the scrubber in side elevation. Fig. 2 is an enlarged end view of the injector for hydrocarbons and steam and also for air to the generator. Fig. 3 is an enlarged section, in part, of the combustion-chamber of the generator-retort, and portion of the same above the combustion-chamber.

Similar letters and numerals of reference indicate the same parts in the several figures of the drawings.

A indicates a generator-retort of any commonly well-known construction for the generation of gas from hydrocarbons, and preferably in conjunction with steam and air, and preferably constructed with a combustion-chamber 1, the upper end of which terminates in a cone 2, supporting a checker-work 3, the sides and top of which are surrounded by a vaporizing-chamber 4, one wall of the combustion-chamber 1 and a portion of the cone 2 being reinforced by breaker-wall 5, arranged in such relation to an injector 6 that the hydrocarbons and steam will strike said breaker-wall in such a manner and at such an angle as to promote the atomizing of the liquids and their mixture with each other and air.

The injector 6 consists of a steam-pipe 7, surrounding which is a larger pipe 8, forming an annular passage for the supply of oil to the combustion-chamber and whereby the temperature of the oil is raised before discharging into the combustion-chamber.

The pipe 8 in turn is surrounded by a series of small steam-pipes 9, whereby the mixing and forcing of the steam, air, and oil is promoted on its discharge into the combustion-chamber of the generator, the supply through said respective pipes being regulated by suitable valve—such, for example, as is shown at 10—in the steam-pipe 7.

The generator may and preferably has projecting in its side wall toward the bottom of the vaporizing-chamber 4 an oil-supply pipe 11, provided with a regulating-valve 12 and in its upper end an oil-supply pipe 13, provided with a regulating valve 14; but instead of these oil-pipes alone the steam, air, and oil injector before described may be substituted for one or both of said pipes 11 and 13 and in practice are preferably employed.

The upper part of the generator is connected with a carbureter B by means of a pipe 15, forming the passage 16 at or slightly below the top of the checker-work 3, through which the gases in the generator are discharged at or near the bottom of the carbureter B.

The carbureter B is preferably of the cupola type, so that the gases entering through the passage 16 are compelled to travel the length thereof before their discharge therefrom through a passage 17, formed by pipe 18, connecting the upper part of the carbureter B with the upper part of the carbureter C, which is also preferably of the cupola type and through which the gases must descend before discharging therefrom and through a passage 19, formed by a pipe 20, connecting the carbureter C with the scrubber D at or near its bottom.

Carbureter B is provided with an oil-supply pipe 21, entering its side at a point preferably above the passage 16 for the injection of hydrocarbons into the rising gases, the supply thereof being regulated by valve 22 and a similar pipe 23, projecting down through the upper end thereof, through which hydrocarbons, the supply of which is regulated by valve 24, are discharged into a vaporizing-chamber 25 in the upper part of the carbureter above the passage 17.

Carbureters B and C are both preferably filled, respectively, with checker-work 26 27, but may be of any other refractory material suitable for maintaining a uniform degree of heat in the carbureters and promoting the mixture of the materials and their decomposition into gases, which checker-work or other materials preferably extend to a point terminating just above their connecting-passage 17, so as to provide for the vaporizing-chamber 25 in the carbureter B and a similar vaporizing-chamber 28 in the carbureter C, the latter being also preferably provided at its upper end with an oil-supply pipe 29, supplying hydrocarbons to the vaporizing-chamber 28, the supply of which is controlled by a valve 30; but in this connection it is proper to add that an injector similar to the injector 6 may be substituted for any one or more of the carbureter-pipes 21, 23, and 29.

The carbureters B and C at their bottom ends are connected by an angular or other pipe connection G, in which is formed two vertical passages 31 and 32, opening at their upper ends into the bottom of the carbureters B and C, respectively, and connecting at their lower ends by a horizontal passage 33, in which latter is a fan-blower 34, cooled by water supplied thereto through a pipe 35, provided with a valve 36, the blower being so arranged that in operation gases are discharged from the bottom thereof and at such a point that they must pass across the path of the gases discharging from the generator and directly in front of their discharge-passage before they can ascend to the top of the carbureter B and again discharge into the carbureter C.

The vertical return-passages 31 and 32 may be and preferably are provided with oil-supply pipes 35 and 36, respectively controlled by valves 37 and 38, or in lieu thereof with an injector similar to the injector 6, and the horizontal passage is preferably provided with a steam-injector 39, discharging upwardly into and through passage 37, and therefore not only supplying steam or gas, but operating at the same time in supplementing the fan-blower in returning gases from the bottom of the carbureter C to the carbureter B, as before described.

The scrubber D is of the ordinary construction—that is to say, is provided with a series of plates 40, alternately projecting from the opposite sides thereof in different planes, so as to form a zigzag passage for gases ascending therein and for the water-supply thereto delivered through the pipe 41, controlled by a valve 42, the bottom of the scrubber being connected, as usual, by pipe 43, projecting downwardly to nearly the bottom of the coal-tar receptacle F, which has near its upper portion a discharge-pipe 44, the upper end of the scrubber being also connected by a pipe 45, connected with the exhaust-chamber of an ordinary pump E, from which the gas is discharged under pressure through the pipe 46, the degree of exhaust in the pipe 45 being regulated by means of a valve 47.

In the operation of the apparatus oil and steam in the presence of air are forcibly injected in and through the area of the chamber 1 and against the opposing wall thereof and ignited. When the chamber has become heated, the steam or the oil, or both, are increased, by which means the cumbustion is readily controlled and the volume stagnated because of the restricted outlet of the chamber 1. When the injection of the oil, air, and steam is conducted with the reasonable skill of the art, a smothered condition of the combustion is maintained by reason of the restricted outlet, the oxygen and carbon are combined and to such degree only as will create the necessary decomposing and associating heats and to carbon monoxid as near as may be. Thus when the volume of decomposed elements is so held stagnated and manipulated, baffled, agitated, and contacted by the forcible injection and instantaneous decomposition generated gases are thereby carbureted, and especially the liberated hydrogen of steam within the chamber, and heating and illuminating gases may be withdrawn directly from the generating-chamber continuously. Through the action of the exhaust-pump the gases continually rise in the combustion-chamber and, striking the highly-heated cone, are directed thereby upwardly through the checker-work 3 and thereafter discharged from the generator through the passage 16 into the lower part of the carbureter B, and after traversing upwardly the length thereof, preferably through checker-work, discharge through the passage 17 into the upper part of the carbureter C, whence by the operation of exhaust they are drawn or pulled downwardly, so to speak, through substantially the length of the carbureter C to the passage 19, whence all of them may be discharged into the scrubber D at or near the lower end thereof and continue thence upwardly through the scrubber and to the pump, whence they are discharged under pressure through the pipe 46 to their destination. By this operation all of the gases, and particularly dissociated hydrogen otherwise tending to accumulate in the upper ends of the carbureters B and C, are as fast as they rise first ejected from the carbureter into the upper end of the carbureter C and as continuously forced to descend through substantially the entire length of the carbureter C before any possible escape therefrom to the other carbureters, should a further number be used, or to the scrubber. By this descent, and particularly through the heated checker-work, all of the gases become thoroughly mixed, the result of which is that substantially, if not all of the dissociated hydrogen discharged from the carbureter B is forced into combination with the hydrocarbon vapors before the possibility of their discharge from the carbureter C, and whereby the gas produced is correspondingly increased both in heat units and candle-power as compared with gas heretofore produced, wherein dissociated hydrogen escaping from a generator and an adjacent carbureter thereafter remains uncombined with the carbon-vapors or with the gases, and in this connection it is proper to state that, disregarding the previous and subquent treatment of the gases discharged from the generator, the invention of my method is characterized and distinguished from previous methods in the step by which dissociated hydrogen is forced to continuously descend in a carbureter or other heated receptacle, so as to commingle with the other gases and finally combine therewith.

When for any reason it is desirable to add to the generated gases further hydrogen or hydrocarbons, or either of them, they may be introduced through the pipe 21 into the carbureter B and also through the pipes 23 and 29, respectively, in the upper ends of the carbureters B and C, or either of them, as desired; but ordinarily this is not necessary.

Under the normal operation of the apparatus by an ordinary intelligent attendant substantially all of the dissociated hydrogen will be combined with the carbon-vapors in their descent through the carbureter C; but when the production of gas is forced the regulation of the proportions of oil and steam is not as it should be, (some of the dissociated hydrogen may possibly discharge from the carbureter C,) or when for any other reason there is such a discharge of dissociated hydrogen my invention provides for this by including as an additional step in my process the return of a portion of the gases from the carbureter C to the carbureter B in such a manner that under any operation, forced or otherwise, of the apparatus substantially all of the dissociated hydrogen will be combined with the carbon-vapors before escaping from the carbureter C to the scrubber. To this end is provided the connecting-passages 32, 33, and 31 and the fan 34 in the pipe connection G, before described, and by means of which gases are returned from the bottom of the carbureter C to the carbureter B in such a manner that they must pass directly across the path of the hot gases at the point of their discharge from the generator into the carbureter B. The gases returned in this manner from the carbureter C to the carbureter B may be any proportion of the gases in the carbureter C, and these proportions may be regulated by variations in the degree of exhaust between that which discharges the gases from the carbureter C to the scrubber and that produced by the fan for returning the gases from the carbureter C to the carbureter B. If, for example, we assume for the purpose of illustration that half of the volume of gases in the carbureter C is discharging into the scrubber and the other half is being returned to the carbureter B, the volume of discharging gases may be reduced accordingly as the exhaust from the pump is reduced or, on the other hand, accordingly as the exhaust due to the fan is increased. Now when it is necessary to operate the fan-blower the greater part of the volume of gases in the carbureter C are heavy hydrocarbons, which, owing to their gravity, have in their descent a greater velocity than the dissociated hydrogen, but which, owing to their density, can hold and carry with them dissociated hydrogen in the proportion that one volume compares with the other, and it therefore follows, for example, that if finally fifteen per cent. of the dissociated hydrogen is not combined before any discharge from the carbureter B but five per cent. will be carried out of the carbureter and ten per cent. will be returned with the hydrocarbons to the carbureter B. Again, owing to the density and increased velocity in the descent of the heavy hydrocarbons as compared with the dissociated hydrogen, there is such a continuous friction between the molecule as tends to and no doubt does promote the combining of dissociated hydrogen with hydrocarbon vapors, simultaneously discharging both from the carbureter to the scrubber and returning to the carbureter B.

In practice it has been found that the combination of the returning dissociated hydrogen and heavy hydrocarbons, and therefore a reduction in the volume of their discharge from the carbureter B into the carbureter C, is promoted by the introduction of steam or both steam and hydrocarbons into these returning gases in the same direction and path of travel of their discharge into the carbureter B, while at the same time such steam operates as an auxiliary to the fan-blower for the return of the gases, and under some conditions there is advantage in supplying hydrocarbons to the return-passage through either the pipes 35 or 36, or both, in quantities depending upon the volume and character of the returned gases. This return of a portion of the gases from the carbureter C to the carbureter B simultaneously with a discharge of other portions of the gases from the carbureter C onwardly toward their final destination, and by which heavy hydrocarbons are resubjected to heat directly from the generator, characterizes and distinguishes my invention from the prior art, for it does not appear therein, so far as I am aware, that before my invention a continuous return circulation between a plurality of carbureters had been produced in the presence of a simultaneous supply of gas from a generator to one of them and a discharge of gas from the other onward for its purification or to its destination for subsequent use.

While the drawings illustrate an apparatus especially and particularly desirable for carrying out my method, it is obvious that a substantially different form and construction of apparatus might be employed for the same purpose to the same end and with the same result, for obviously an ordinary gas-generator supplying gas to any ordinary construction of carbureter might be used instead of the generator and carbureter B shown in the drawings when there is also present another carbureter of any construction by which all of the gases in the second carbureter are forced to descend therein before escaping onward toward their final destination, and while the cupola form of carbureter, as shown at C, filled with checker-work is believed to be the best and simplest form and construction for the purpose of carrying out the invention of my method it is obvious that any other form and arrangement by which all of the gas entering a carbureter is forced to descend in a path either on vertical or oblique lines or spiral lines could be adapted for carrying out my invention. It is also equally obvious that the form and arrangement of connections by which a portion of the gases are returned from one carbureter to the other simultaneously with a discharge of a portion of the gases onward to their destination might be substantially varied from that shown in the drawings, and that my method might be performed by an apparatus either in whole or in part not the mechanical equivalent of that illustrated without a departure from my invention, and therefore that the method described and hereinafter claimed is not due to the function of the apparatus as illustrated for the purpose of such a disclosure of my invention as will enable others to perform the same.

My invention and method is not limited in its application to the production of gas from liquid hydrocarbons alone or conjointly with steam, but includes the production of gas from steam alone, inasmuch as the quality thereof is substantially improved, in that by the passage of its gases and vapors downwardly through the carbureter C the mixing of the fixed gases with the vapors is promoted to a degree increasing the volume of the fixed product, and this is particularly true when a substantial volume of these vapors is returned to the carbureter B simultaneous with the discharge of other gases onward to their destination and which are thereby substantially fixed in their entirety. In this connection it is proper to observe that when the apparatus is employed for making water-gas alone it is first heated by the employment of hydrocarbons and air, as before described, until the checker-work in and throughout the generator and the carbureter is at the degree of heat usually employed in the manufacture of water-gas, the manufacture of water-gas in my apparatus being continued until the heat of the checker-work is reduced below the degree necessary for that purpose when the steam is shut off, and the checker-work is again reheated in the manner before described.

Having thus described my invention, what I claim as new therein, and desire to secure by Letters Patent, is—

1. In a method of producing gas, the herein-described step, which consists in returning a portion of the gases upwardly through one carbureter and downwardly through another carbureter and concurrently therewith simultaneously discharging the other portion of said gases onward to their destination, substantially as described.

2. In a method of producing gas, the herein-described steps which consist, first in conducting gases from the generator upwardly through a carbureter, and thence downwardly through another carbureter and thereafter returning a portion of said gases to the first carbureter and simultaneously therewith discharging the other portion of said gases from the second carbureter onward toward their destination, substantially as described.

3. In a method of producing gas, the herein-described steps, which consist in conducting all of the gases downwardly through a carbureter and simultaneously with a discharge of a portion of said gases onward to their destination returning the other portion of said gases to and upwardly through a carbureter receiving gases from the generator upwardly through which carbureter the gases have previously ascended, substantially as described.

4. In the production of gas, the herein-described method which consists in directing gases from the upper part of the generator upwardly through an adjacent carbureter and thence downwardly through another carbureter and simultaneously therewith discharging a portion of said gases from the carbureter into a scrubber and reconducting the other portion of said gases to and directing them upwardly in the first carbureter mixed with the gases discharged therein from the generator, substantially as described.

5. In the production of gas, the herein-described method, which consists in conducting gases from the generator upwardly through a carbureter, thence downwardly through another carbureter concurrently with a simultaneous discharge of a portion of said gases of descend onward to their destination simultaneously with the return of the other said gases upwardly through the first carbureter in the path of the heated gases discharging from the generator, substantially as described.

6. The herein-described method of producing gas, the same consisting in conducting gases from a generator upwardly through a carbureter, then discharging the same into the upper portion of another carbureter and continuously conducting said gases downwardly therethrough, while simultaneously returning a portion of said gases upwardly through the first carbureter and discharging the remainder onward to their destination and concurrently injecting steam into said return-gases in the direction and line of travel of ascending of said gases in the first carbureter, substantially as described.

7. The herein-described method of producing gas, which consists in conducting gases directly from the generator upwardly through a carbureter and thence downwardly through another carbureter simultaneously with the return of a portion of said gases to the first carbureter and the discharge of the other portion onwardly to their destination, and concurrently therewith supplying said return-gases with steam and oil injected into one or both carbureters, substantially as described.

JACOB S. SMITH.

Witnesses:
M. B. ALLSTADT,
A. M. UHER.